United States Patent [19]

Cooper

[11] 4,348,983

[45] Sep. 14, 1982

[54] METHOD FOR INDUCING SET IN PLANKTONIC BIVALVES

[76] Inventor: Kenneth L. Cooper, P.O. Box 940, Arcata, Calif. 95521

[21] Appl. No.: 299,765

[22] Filed: Sep. 8, 1981

[51] Int. Cl.³ ............................................. A01K 61/00
[52] U.S. Cl. ...................................................... 119/4
[58] Field of Search ........................................... 119/4

[56] References Cited

U.S. PATENT DOCUMENTS

| | | | |
|---|---|---|---|
| 3,103,202 | 9/1963 | Losanoff et al. | 119/4 |
| 3,486,486 | 12/1969 | Vanderborgh et al. | 119/4 |
| 3,552,357 | 1/1971 | Quayle | 119/4 |
| 3,701,338 | 10/1972 | McMilliam | 119/4 |
| 3,735,737 | 5/1973 | Budge | 119/4 |
| 4,198,926 | 4/1980 | Morse | 119/4 |

OTHER PUBLICATIONS

Veitch and Hidu, Gregarious Setting in the American Oyster . . . , Ches. Science, vol. 12, No. 3, pp. 173–178 (Sep. 1971).

Waite and Anderson, 3,4-dihydroxyphenylalanine (DOPA) . . . , Biol. Bull., 158: 164–173 (Feb. 1980).

Keck et al., Chemical Stimulants Affecting Larval Settlement . . . , Pro. Nat. Shellfish Asso., vol. 61, pp. 22–28 (Jun. 1971).

*Primary Examiner*—Hugh R. Chamblee
*Attorney, Agent, or Firm*—Townsend and Townsend

[57] ABSTRACT

A method for inducing the setting of planktonic bivalves onto a substrate is disclosed. Planktonic bivalves, which have reached the competent pediveliger stage, are exposed to certain 1-substituted-3,4-dihydroxylbenzenes at a sufficient concentration to induce setting. The preferred concentration is at least about $10^{-8}$M with no upper limit and the preferred compound is 3,4-dihydroxyphenylalanine.

5 Claims, No Drawings

METHOD FOR INDUCING SET IN PLANKTONIC BIVALVES

BACKGROUND OF THE INVENTION

1. Field of the Invention

The present invention relates generally to mariculture, and, more particularly, to a method for inducing planktonic bivalves to set on a substrate.

Oysters, mussels, clams, scallops and the like are referred to as bivalves, and the commercial farming of such bivalves is referred to as bivalve culture. All bivalves have a similar life cycle. Initially, the bivalve larvae are free swimming ("planktonic"). After a time, the planktonic larvae develop into a stage capable of crawling referred to as a pediveliger. Pediveligers which are capable of attaching to a substrate (referred to as "setting") are said to be competent. After setting on a substrate, such as rocks, sticks, aged adult shells and the like (referred to as "cultch"), the larvae are allowed to develop and are finally harvested when they reach a suitable size. The expansion of the bivalve culture industry has been limited by the lack of an effective method of replacing population lost through harvest and mortality with new larvae. In part, this is due to a inability to effectively induce competent pediveligers to set on a desired substrate such as cultch in an artificially maintained setting tank.

The oyster industry has developed a method for allowing the setting of hatchery-reared competent pediveligers onto cultch. The technique involves placing the competent pediveligers into a tank filled with seawater and containing cultch. The pediveligers are allowed to set on the cultch, under controlled temperature conditions, for a time sufficient to achieve the desired number of larvae attached to the cultch. This method, although functional, requires seeding a very large number of larvae in the setting tank because of the inherently low percentage of larvae which set. Moreover, the method requires that the seed larvae have already reached the competency stage prior to seeding, or that the period of time in the tank be increased until they reach such stage, in order for setting to occur. A final shortcoming of the prior art is that the cultch must be of a certain type which presents the proper tactile stimuli to the pediveligers to induce setting thereon. It is, therefore, desirable that a method be found to induce bivalve larvae to set on a wide variety of substrates at a relatively high percentage of set within a relatively short period of time.

2 Description of the Prior Art

Veitch and Hidu in an article entitled *Gregarious Setting in the American Oyster Crassostrea virginica Gmelin: I. Properties of a Partially Purified "Setting Factor"*, Chesapeake Science, Vol. 12, No. 3, p. 173-178 (Sept. 1971) identified four molecules (tyrosine, thyroxine, 3, 5-diiodotyrosine, and 3-iodotyrosine), separated from a conjugate protein found in oyster shell liquor, which were found to promote setting of planktonic oyster larvae. In testing the effects of these molecules on pediveligers, the results were statistically significant, but addition of the complete conjugate protein was much more effective in enhancing the setting response than any of the molecules tested individually. They concluded that the gregarious setting factor was the complete thyroprotein with a molecular weight in excess of 100,000 Daltons.

SUMMARY OF THE INVENTION

It has now been discovered that planktonic bivalves may be induced to set on a substrate by adding a sufficient amount of certain 1-substituted-3,4-dihydroxybenzenes to the seawater habitat. It is preferred that these compounds be added to a final concentration of at least about $10^{-8}$ M. It is also preferred that the temperature in the seawater be maintained in the range from 70° F. to 82° F.

DESCRIPTION OF THE PREFERRED EMBODIMENTS

The compounds of the present invention have the formula:

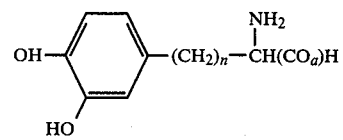

wherein n is from 0 to 3 and a is 0 to 2.

The compounds apparently act on a specific chemoreceptor on the bivalve larvae which triggers the metamorphosis from the planktonic state to the post-larval state. The chemoreceptor is specific for the 3,4-dihydroxybenzene compounds of the present invention. In particular the amino acid 3,4-dihydroxyphenylalanine has been found to be effective. Compounds having a dissimilar structure, such as γ-aminobutyric acid, have been found not to induce metamorphosis and setting.

The method of the present invention is carried out by collecting competent pediveligers and placing them into a setting tank. The setting tank is filled with seawater at a temperature preferably maintained in the range of from 70° F. to 82° F. The tank will contain a cultch material, typically old shells of the bivalve being cultured. The 1-substituted 3,4-dihydroxybenzene is added to the seawater to a final concentration of at least $10^{-8}$ M with no upper limit, preferable from $10^{-6}$ M to $10^{-3}$ M. Typically, the tank will be agitated to cause equal distribution of the larvae and chemical throughout the system.

Competency of the pediveligers may be determined by visual examination. Competent pediveligers display paired eyespots and development of a single foot functional for crawling. Alternately, the compounds of the present invention may be used to determine competency. The pediveligers are placed in a smooth glass dish filled with sterile seawater. In such an environment, free from chemical and tactile stimuli, the pediveligers will continue in their planktonic stage indefinitely without either setting or metamorphosing. Such metamorphosis and setting can be induced by adding the compounds of the present invention at a sufficient concentration, $10^{-5}$ M. When a sufficient percentage of the pediveligers, typically 50 percent, are observed to have attached after a reasonable time period, typically 12 hours, the pediveligers are considered to be competent. Larvae from the batch tested can then be transferred to the setting tank to carry out the method of present invention.

The following experiments are offered by way of example only and are not intended to limit the scope of the present invention in any manner.

EXPERIMENTAL

Gravid female and male mussels, *mytilus edulis*, were induced to spawn by thermal shock. The eggs and sperm were collected separately and the eggs were then fertilized with 1 ml of a dense sperm suspension per one million eggs. The larvae were raised in 50 l polyethylene containers, in seawater at a mean temperature of 16° C., with air introduced to maintain circulation. The larvae were fed on demand with *Pavolva lutheri* for the first ten days followed by a mixture (85:15) of *Thallasiosira pseudonana* and *Dunaliella tertiolecta* for the remainder of the rearing period. The paired eyespots first appeared on the sixteenth day and were fully developed on the nineteenth day. On the nineteenth day, aliquots of pediveligers were taken from the rearing tanks and placed in a series of glass culture dishes containing sterile seawater and the chemical to be tested. The smooth glass surface of the culture dish was the only substrate available for the larvae to attach. To the first two dishes, 3,4-dihydroxphenylalanine was added at final concentrations of $10^{-5}$ M and $10^{-6}$ M, respectively. To the next two dishes, γ-aminobutyric acid was added, also at final concentrations of $10^{-5}$ M and $10^{-6}$ M, respectively. To the fifth dish, no chemicals were added. The number of larvae attached to the smooth glass surface were counted 12 hours after being placed in the test dish and were reexamined at 48 hours for evidence of metamorphosis. The results are summarized in Table 1, below.

TABLE 1

| Chemical Added | Concentration | No. of Pediveligers | No. Attached (12hrs) | Metamorphosed (48hrs) |
|---|---|---|---|---|
| none (control) |  | 237 | 0 | 0 |
| 3,4-dihydroxy-phenylalanine | $10^{-5}$M | 197 | 70 | 70 |
|  | $10^{-6}$M | 297 | 28 | 28 |
| γ-aminobutyric acid | $10^{-5}$M | 227 | 0 | 0 |
|  | $10^{-6}$M | 212 | 0 | 0 |

From the foregoing it can be seen that the method of the present invention provides a readily controlled chemical method for inducing the setting response in bivalves. The method is particularly applicable to bivalve larval setting systems presently being used by the oyster industry, but it is applicable to all bivalves.

Although the foregoing invention has been described in some detail by way of illustration and example for purposes of clarity and understanding, it wll be obvious that certain changes and modifications may be practiced within the scope of the claims.

What is claimed is:

1. A method for inducing planktonic bivalves to set on a substrate in seawater, said method comprising adding a sufficient amount of a 1-substituted-3,4-dihydroxybenzene to said seawater to induce such setting.

2. A method for raising planktonic bivalve larvae on a substrate in seawater to a suitable size, said method comprising:
   collecting the planktonic larvae when they have become competent pediveligers;
   placing the larvae in seawater having a sufficient concentration of a 1-substituted-3,4-dihydroxybenzene to induce the larvae to set on the substrate;
   maintaining the temperature in the range from 70° F. to 82° F.;
   allowing the larvae to remain in seawater and attached to the substrate until they have metamorphosed and achieved a suitable size; and
   collecting the bivalves from or with the substrate.

3. A method as in claim 1 or 2, wherein said 1-substituted-3,4-dihydroxybenzene has the formula:

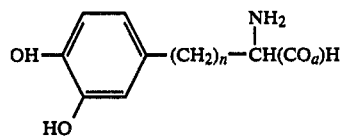

wherein n is from 0 to 3 and a is 0 to 2.

4. A method as in claim 1 or 2, wherein said 1-substituted-3,4-dihydroxybenzene is 3,4-dihydroxyphenylalanine.

5. A method as in claim 1 or 2, wherein the 1-substituted-3,4-dihydroxybenzene is added to a final concentration of at least $10^{-8}$ M.

* * * * *